Patented Apr. 14, 1942

2,279,900

UNITED STATES PATENT OFFICE 2,279,900

SEPARATING AND SEPARATELY RECOVERING ZINC AND NICKEL

Arthur L. Christensen, Woodbridge, N. J., assignor to International Smelting and Refining Company, a corporation of Montana No Drawing. Application July 18, 1940, Serial No. 346,151

8 Claims. (Cl. 75—63)

This invention relates to separating and separately recovering zinc and nickel, particularly from mixed nickel and zinc salts such as may be produced in the treatment of non-ferrous secondary metals. The invention has for its principal object the provision of an effective method for the treatment of mixed salts of zinc and nickel to separate the zinc from the nickel and to recover each separately in suitable form.

In accordance with the method of the invention, mixed salts (such as complex mixed sulphates) of nickel and zinc are treated to form therefrom a mixture of nickel and zinc oxides. This may be accomplished in the case of the sulphates, for example, by heating the mixed sulphates at a sufficiently high temperature, advantageously about 1800 to 2000° F., for an appropriate period of time. The mixture of oxides thus produced is then subjected in a suitable furnace and at an elevated temperature to the action of a reducing agent in such manner that metallic zinc is formed and vaporized from the charge, and metallic nickel is produced. The vaporized metallic zinc is withdrawn from the furnace and collected in suitable form, and the metallic nickel is separately withdrawn from the furnace.

A particularly satisfactory manner in which to recover the zinc is to oxidize the metallic zinc vapors to form a zinc oxide fume, and to collect the resulting fume in any suitable manner.

The method of the invention is particularly adapted for use in separately recovering zinc and nickel from secondary metals, such as zinc and nickel bearing cupreous secondary metals. In such a process, the secondary metals may be melted and cast into the form of impure anodes containing the bulk of the copper and nickel and at least a small amount of the zinc originally present in the secondary metals. The anodes are subjected to electrolysis under such conditions that copper in substantially pure form is deposited at a cathode, and nickel and zinc from the anodes are introduced into solution in the electrolyte employed. Portions of the electrolyte are periodically withdrawn from the electrolytic operation, and the portion so withdrawn is concentrated, as by evaporation, and a mixture of zinc and nickel salts is crystallized from the concentrated electrolyte. The crystallized salts are drained and substantially dried, and may then be treated for the separation and separate recovery of the zinc and nickel which they contain in the manner set forth above.

By way of example the process of the invention is described below in connection with a process for the recovery of metal values from predominantly cupreous secondary metals. The secondary or scrap cupreous metals as they come to the refinery contain in varying proportions all of the metals commonly alloyed with, plated on, or otherwise associated with copper, such, for example, as zinc, nickel, tin, and lead. This heterogeneous mixture of metals is first melted in a suitable furnace and the molten charge is blown with air to oxidize the bulk of the zinc and form a zinc oxide fume which is collected in a baghouse or by other means. It is not considered desirable to oxidize all of the zinc in the furnace charge, for by doing so a portion of the copper and other valuable metal components would be undesirably oxidized. Consequently a small amount of the zinc, together with practically all of the copper and nickel, remains as molten metal in the furnace when the blowing operation is terminated. This metal is cast into anode form.

The cast anodes are subjected to an electrolytic operation in suitable cells in contact with a sulphuric acid electrolyte. In the course of the electrolytic operation, copper is dissolved from the anodes and for the most part is deposited in substantially pure form on suitable copper cathodes. The other metals present in the anode partly go into solution in the electrolyte and partly collect as electrolytic cell sludge or slimes. The zinc and nickel present in the anodes, together with some of the copper, constitute the major amount of the metals which enter and remain in solution in the electrolyte.

It is necessary to prevent the concentration of zinc and nickel in the electrolyte from rising too high, for otherwise the electrolytic operation will not continue to proceed efficiently. This is accomplished by periodically removing portions of the electrolyte from the electrolytic operation and subjecting the withdrawn electrolyte to a secondary electrolytic operation in the presence of insoluble anodes to plate out most of the copper. The resulting substantially copper-free electrolyte, containing principally nickel and zinc as the valuable metals but also containing small amounts of iron, copper, tin, and alkali and alkaline earth metals as impurities, is then concentrated by evaporation to about one-fifth its original volume. The concentrated electrolyte is introduced into suitable acid-resistant crystallizing tanks, and there is allowed to remain for a sufficient period of time for the bulk of the nickel and zinc to crystallize out of solution. The crystallized salts, which appear to form as a complex zinc-nickel sulphate rather than a simple mixture of zinc sulphate with nickel sulphate, are separated from the mother liquor and are allowed to drain. The mother liquor, which is high in sulphuric acid, is returned to the primary electrolytic operation for use in the electrolysis of a further quantity of secondary metal anodes.

The crystallized zinc-nickel sulphates may contain about 4% to 8% nickel, about 10% to 18% zinc, a large amount of water of crystallization, about 5% free sulphuric acid, and small amounts of other metals such as iron, copper, tin, and various alkali and alkaline earth metals, all as sulphates. This complex mixture of sulphates dries substantially during the draining operation, and after completion of this operation is in condition for treatment to recover the zinc and nickel which it contains.

The substantially dry salts are charged into a suitably fired furnace. A rotary cylindrical furnace rotated at about 1 to 3 R. P. M. may be employed effectively. The furnace may be fired by an oil burner extending axially into one end of the furnace, and a flue may communicate axially with the interior of the furnace at the other end. As the charge in the furnace is heated by the oil burner, it is dehydrated and its volume is very materially reduced. At the same time the sulphates are decomposed and converted to oxides.

Owing to the large reduction of volume of the charge as it is dehydrated and desulphated, it is desirable to continue charging the complex zinc-nickel sulphates into the furnace as reduction of volume of the charge makes space available. In this manner a substantial charge of oxides is accumulated in the furnace. In the case of a cylindrical rotary furnace having a capacity of about five tons, a period of about forty hours may be required to accumulate a full charge of oxides. At the end of this period the charge of oxides in a five-ton furnace will represent the valuable metal content of fifteen to twenty tons of the original sulphates.

A temperature of 1800 to 2000° F. should be attained in the furnace, at least toward the end of the period during which sulphates are charged, to insure substantially complete desulphatizing of the charge. A dilute sulphur dioxide gas is evolved from the furnace charge during decomposition of the sulphates. Completion of the desulphating operation after the full desired amount of sulphates has been charged is evidenced by the almost complete absence of sulphur dioxide from the furnace gases.

After completion of the desulphating operation, a reducing agent, advantageously coke screenings, is charged into the furnace to begin reduction of the oxides to metallic form. Coincident with first charging the coke or other reducing agent into the furnace, the furnace flue is connected to a baghouse of conventional design. The coke or other reducing agent converts the zinc present in the furnace charge to metallic zinc, which at the temperature prevailing is vaporized and passes from the furnace with the combustion gases. The zinc might be condensed from these gases and recovered as metallic zinc, but generally it is preferable to admit a sufficient amount of air to the furnace flue at a point close to the furnace to oxidize the zinc vapors and form therefrom a zinc oxide fume. This fume passes to the baghouse and is there collected.

The coke or other reducing agent also reduces the nickel present in the furnace charge to molten metallic form. The molten metallic nickel remains in the furnace. As the zinc is reduced and vaporized and as the nickel is reduced, the volume of the charge in the furnace diminishes. As space in the furnace becomes available due to this reduction in the volume of the charge, additional coke or other reducing agent is added until the total amount required to reduce all of the oxides present has been charged.

The temperature during this reduction period rises to above 2100° F. from the combined effects of the oil firing, the burning coke, and the reduction reactions. In the case of a five-ton furnace fully charged as described above, a period of about twenty hours ordinarily is required before the full amount of coke has been added. The reduction operation is continued, however, after the total required amount of coke has been added until dezincing of the charge is substantially complete and the nickel has been substantially completely reduced. Completion of the dezincing is indicated when the characteristic flame of burning zinc vapor is no longer noticeable in the flue leading from the furnace, and by this time virtually all of the nickel will be present in the furnace as molten metallic nickel. In the case of the five-ton furnace of the example, a period of about ten hours following the last addition of coke ordinarily is required for this stage to be reached. Rotation of the furnace is then stopped and a suitable tap hole is opened in the cylindrical side wall of the furnace. The cylinder is rotated to bring this tap hole to the bottom, and the molten nickel is tapped from the furnace into suitable molds. Some slag is formed in the furnace, principally from the furnace lining. This slag solidifies as a separate layer on top of the metal and is easily separated.

The metallic nickel may be treated in any suitable manner for purification or for conversion to nickel salts for the market, or, if desired, the metallic nickel may be sold directly as an impure nickel product.

After tapping of the furnace has been completed, the furnace is rotated to bring the tap hole to the top, a further quantity of mixed nickel-zinc sulphates is charged into the furnace, the tap hole is plugged with clay, and the above described cycle of operations is repeated for the recovery of further quantities of nickel and zinc from the mixed nickel-zinc sulphates.

From a total of about twenty tons of complex nickel-zinc sulphates charged into the furnace in one cycle of operations, a total of about three to three and one-half tons of zinc oxide is obtained. This oxide contains about 70% zinc, together with small amounts of impurities. The principal impurity is nickel oxide, a small amount of which is mechanically blown out of the furnace chiefly during the first part of the dezincing operation. The zinc oxide ordinarily also contains as impurities small amounts of coke, coke ash, and oxides of copper and iron. This zinc oxide product does not differ greatly from the usual low grade zinc oxide of commerce, but it ordinarily requires further refining to meet pure zinc oxide specifications.

About 2500 pounds of impure nickel residue metal is obtained from the charge of twenty tons of complex sulphate salts. This metal analyzes about as follows: Nickel 70% to 80%, iron 10% to 15%, copper 4% to 6%, sulphur 3% to 8%, zinc a trace to 2%. This metallic nickel product may be refined by usual methods for the production of high grade metallic nickel or cupro-nickel, or it may be treated for the production of high grade nickel salts. If desired, however, it may be sold directly as impure nickeliferous material.

Although the invention has been described above with particular reference to a process for the treatment of secondary metals, it is apparent that the method of the invention for separating and separately recovering nickel and zinc from mixed nickel and zinc salts may be employed in other processes as well. The process of the invention ordinarily is applied to mixed nickel-zinc sulphates for the separation and separate recovery of the zinc and nickel present therein, but the process may also be applied to other mixed salts of nickel and zinc, such as mixed nickel-zinc chlorides or mixed nickel-zinc nitrates. These salts may be converted to oxides by any known method preparatory to dezincing and reduction of the nickel. In cases where a mixture of zinc and nickel oxides is available as such, it may be treated directly with coke or other reducing agent in accordance with the invention to separate and separately recover the zinc and nickel which they contain. Coke screenings constitute a preferred reducing agent because of their cheapness and general availability, but, of course, coke in other forms, or other well-known reducing agents, may be employed in reducing the oxides.

I claim:

1. The process of separating and separately recovering copper, zinc and nickel from non-ferrous secondary metal containing copper, zinc, and nickel, which comprises forming from said metal anodes containing the bulk of the copper and nickel and at least a small amount of the zinc originally present in the secondary metal, subjecting said anodes in a sulphuric acid electrolyte to electrolysis under such conditions that substantially pure copper is deposited at a cathode and zinc and nickel from the anodes is dissolved in the electrolyte, periodically withdrawing a portion of the electrolyte from the electrolysis operation, concentrating the withdrawn portion of electrolyte and crystallizing a mixture of zinc and nickel sulphates therefrom, returning the mother liquor from the crystallizing step to the electrolysis operation, substantially drying the crystallized mixed sulphates, thereafter charging the mixed sulphates into a suitable furnace, heating the charge in the furnace to a temperature sufficiently high and for a sufficient period of time to form therefrom a mixture of nickel and zinc oxides, thereafter introducing finely divided coke into the furnace, heating the mixed oxides in contact with the coke at a sufficiently high temperature and for a sufficient period of time to form a vaporize metallic zinc and to form molten metallic nickel, withdrawing and collecting the vaporized zinc in suitable form, and separately withdrawing the molten metallic nickel.

2. The method of separately recovering zinc and nickel from mixed nickel and zinc sulphates which comprises heating the mixed sulphates at a temperature sufficiently high to form therefrom a mixture of nickel and zinc oxides, subjecting the oxides in a suitable furnace and at an elevated temperature to the action of a reducing agent in such manner that metallic zinc is formed and vaporized from the charge and metallic nickel is produced, withdrawing and collecting the metallic zinc in suitable form, and separately withdrawing the metallic nickel.

3. The method of separately recovering zinc and nickel from mixed nickel and zinc sulphates which comprises heating the mixed sulphates at a temperature of about 1800 to 2000° F. to form therefrom a mixture of nickel and zinc oxides, subjecting the oxides in a suitable furnace and at an elevated temperature to the action of a reducing agent in such manner that metallic zinc is formed and vaporized from the charge and metallic nickel is produced, withdrawing and collecting the metallic zinc in suitable form, and separately withdrawing the metallic nickel.

4. The method of separately recovering zinc and nickel from mixed nickel and zinc sulphates which comprises heating the mixed sulphates at a temperature sufficiently high to form therefrom a mixture of nickel and zinc oxides, subjecting the oxides in a suitable furnace and at an elevated temperature to the action of a reducing agent in such manner that metallic zinc is formed and vaporized from the charge and metallic nickel is produced, withdrawing and oxidizing the metallic zinc vapors to form a zinc oxide fume, collecting said fume, and separately withdrawing molten metallic nickel from the furnace.

5. The method of separately recovering zinc and nickel from mixed nickel and zinc sulphates which comprises charging the mixed sulphates into a suitable furnace, heating the charge in the furnace to a temperature sufficiently high and for a sufficient period of time to form therefrom a mixture of nickel and zinc oxides, thereafter introducing finely divided coke into the furnace, heating the mixed oxides in contact with the coke at a sufficiently high temperature and for a sufficient period of time to form and vaporize metallic zinc and to form molten metallic nickel, withdrawing and collecting the vaporized zinc in suitable form, and separately withdrawing the molten metallic nickel.

6. The method of separately recovering zinc and nickel from mixed nickel and zinc sulphates which comprises charging the mixed sulphates into a suitable furnace, heating the charge in the furnace to a temperature sufficiently high and for a sufficient period of time to form therefrom a mixture of nickel and zinc oxides, thereafter introducing finely divided coke into the furnace, heating the mixed oxides in contact with the coke at a sufficiently high temperature and for a sufficient period of time to form and vaporize metallic zinc and to form molten metallic nickel, withdrawing and oxidizing the metallic zinc vapors to form a zinc oxide fume, collecting said fume, and separately withdrawing molten metallic nickel from the furnace.

7. The method of separately recovering zinc and nickel from mixed zinc and nickel hydrated sulphates which comprises substantially filling a suitable furnace with a charge of said sulphates, heating the charge in the furnace to a temperature sufficiently high and for a sufficient period of time to form therefrom a mixture of zinc and nickel oxides while at the same time the bulk of the charge in the furnace is reduced, charging additional amounts of the mixed sulphates into the furnace as the bulk of the charge therein diminishes and until a desired total amount of sulphates has been charged, thereafter discontinuing the charging of additional sulphates and introducing finely divided coke into the furnace, heating the mixed oxides in the furnace in contact with the coke at a temperature sufficiently high and for a sufficient period of time to form and vaporize metallic zinc and to form molten metallic nickel, withdrawing and collecting the vaporized zinc in suitable form, and separately withdrawing the molten metallic nickel.

8. The method of separately recovering zinc and nickel from mixed zinc and nickel hydrated sulphates which comprises substantially filling a suitable furnace with a charge of said sulphates, heating the charge in the furnace to a temperature sufficiently high and for a sufficient period of time to form therefrom a mixture of zinc and nickel oxides while at the same time the bulk of the charge in the furnace is reduced, charging additional amounts of the mixed sulphates into the furnace as the bulk of the charge therein diminishes and until the furnace is substantially filled with the mixture of zinc and nickel oxides, thereupon discontinuing the charging of additional sulphates and introducing finely divided coke into the furnace, heating the mixture of oxides in contact with the coke at a sufficiently high temperature to form and vaporize metallic zinc and to form molten metallic nickel while at the same time causing the bulk of the oxide charge in the furnace to be reduced, charging coke into the furnace as the bulk of the oxide charge diminishes and until sufficient coke has been added to reduce substantially all of the oxides in the furnace to metallic form, withdrawing and collecting in suitable form the vaporized zinc as it is produced, and separately withdrawing the molten metallic nickel from the furnace when substantially all of the zinc has been vaporized and withdrawn therefrom.

ARTHUR L. CHRISTENSEN.

CERTIFICATE OF CORRECTION.

Patent No. 2,279,900. April 14, 1942.

ARTHUR L. CHRISTENSEN.

It is hereby certified that error appears in the printed specification of the above numbered patent requiring correction as follows: Page 1, second column, line 50, for "exaporation" read --evaporation--; page 3, first column, line 58, claim 1, for "form a" read --form and--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.